United States Patent [19]

Davis

[11] Patent Number: 4,811,746
[45] Date of Patent: Mar. 14, 1989

[54] SUBSTITUTE FOR ORAL SMOKELESS TOBACCO AND METHOD OF MAKING THE SAME

[76] Inventor: Lori J. Davis, 256 SW. Tualatin Loop, West Linn, Oreg. 97068

[21] Appl. No.: 49,561

[22] Filed: May 14, 1987

[51] Int. Cl.⁴ .............................................. A24B 1/00
[52] U.S. Cl. ................................... 131/359; 131/352; 131/369
[58] Field of Search ...................... 131/359, 369, 352

[56] References Cited

U.S. PATENT DOCUMENTS

| | | |
|---|---|---|
| 1,206,467 | 11/1916 | Reid . |
| 1,239,313 | 9/1917 | Snyder . |
| 2,060,461 | 11/1936 | Dyckman . |
| 2,886,440 | 7/1956 | Kramer et al. . |
| 3,067,068 | 12/1962 | Finberg . |

FOREIGN PATENT DOCUMENTS 0338801  5/1903  France .

Primary Examiner—J. Millin
Attorney, Agent, or Firm—Stoel Rives Boley Jones & Grey

[57] ABSTRACT

A method of making a substitute for oral smokeless tobacco comprises the steps of applying a coating of binding agent on fragments of tea to form a cohesive material and moistening the fragments of the tea sufficiently to form a compact mass which is dissociable into portions of selectable size by hand-pinching the mass. The resulting composition resembles genuine smokeless tobacco in appearance, texture, tactile response, and mode of use. One uses the composition by taking a pinch of the composition and placing it in his mouth between the cheek and gum. The composition produces brown juices which provide an expectorate resembling that of genuine smokeless tobacco. The composition is packageable in a low profile cylindrical container of the type used to package snuff.

9 Claims, No Drawings

SUBSTITUTE FOR ORAL SMOKELESS TOBACCO AND METHOD OF MAKING THE SAME

TECHNICAL FIELD

This invention relates to chewing substances, and in particular, a tobacco-free composition and a method of making the same which simulates the texture, appearance, tactile sensation, and mode of use of oral smokeless tobacco but which mitigates the deleterious health risks posed by the use of such tobacco products.

BACKGROUND OF THE INVENTION

There has been a resurgence in the United States in the use of all forms of smokeless tobacco, including chewing tobacco and snuff. The use of smokeless tobacco of any type in general parlance is loosely referred to as "chewing," although the term "dipping" is particularly associated with the use of snuff. The use of smokeless tobacco entails the placing of a golf ball size wad of leaf tobacco or a pinch of powdered tobacco in the gingival buccal area of the mouth cavity and sucking on the quid. The term "quid" is given to a portion of smokeless tobacco which is held in the mouth for chewing or dipping. Many persons chew or dip during most waking hours, and some persons keep a quid in place for 24 hours a day.

Sales of smokeless tobacco have increased about 11% each year since 1974 with an estimated 22 million users in this country. An influx of youthful chewers and dippers, primarily young male athletes and students in high school and college, has helped sustain the increase in sales of smokeless tobacco products each year since 1974. Surveys have shown that it is not uncommon for a young boy to start habitual chewing, dipping, or both at the age of 10 to 12 in imitation of his elders and peers.

The use of smokeless tobacco has gained social acceptance. A worn, bleached round ring outline, of the size and shape of a snuff container, on the back pockets of jeans is considered a symbol of virility, maturity, and toughness.

The use of smokeless tobacco induces an increased flow of saliva; therefore, smokeless tobacco users must periodically spit out the excess tobacco juices which build up in their mouths. The spitting of the brown juices produced by smokeless tobacco is considered by users to be a source of enjoyment as well. In fact, spitting is actually an art form.

Unfortunately, it has been reported that the use of smokeless tobacco is addictive and that oral leukoplakia is a common result of the use of tobacco in the oral cavity. Leukoplakia is a lesion of the soft tissues of the mouth, the lesion having the appearance of a white patch or plaque. Leukoplakia is currently considered precancerous and has a malignant transformation rate of between 3% and 5%. Moreover, cancer of the esophagus, larynx, pharynx, and oral cavity are related to the use of smokeless tobacco products.

Studies have indicated that nausea, dizziness, hiccoughs, and throat and mouth irritation are also possible side effects of oral smokeless tobacco use. It has also been reported that smokeless tobacco can produce significant effects on the soft and hard tissues of the mouth including bad breath, discolored teeth and restorations, abrasions of the incisal and occlusal surfaces of the teeth, decreased ability to taste and smell, gingival recession, advanced periodontal destruction of the soft and hard tissues, and erythema of the soft tissues. See *Journal of the American Dental Association*, Vol. 101, September 1980, pp. 464–469, "The case against smokeless tobacco: five facts for the health professional to consider" by A. G. Christen and Journal of the *American Medical Association*. Vol. 247, No. 7, 1982, p. 947, "Snuff gives heart rate, blood pressure a kick" by P. Gunby.

SUMMARY OF THE INVENTION

It is therefore an object of this invention to provide a substitute for oral smokeless tobacco and a method of making the same which does not cause the deleterious health problems enumerated hereinabove.

Another object of this invention is to provide such a substitutionary product which simulates the appearance, texture, tactile response, and mode of use of genuine oral smokeless tobacco.

In accordance with the present invention, a method of making a substitute for oral smokeless tobacco includes the application of a coating comprising a binding agent on fragments of tea to form a cohesive mixture thereof. The fragments of tea are moistened sufficiently to form a compact mass which is dissociable into portions of selectable size by hand-pinching the mass.

The fragments of tea simulate the appearance and texture of tobacco and are preferably in the form of flakes of tea leaves of the general size of the finely cut tobacco packed in snuff containers. A binding agent of honey and flour causes agglutination of the fragments of tea to form a moderately cohesive mixture which can be hand-pinched and easily separated into portions of the desired size. The honey also sweetens the taste of the mixture. Water is added as a moistening agent for the mixture so that the resulting composition easily settles into a compact mass in a container of the type in which snuff is typically packaged.

A flavoring agent, preferably a liquid extract having the same taste and fragrance as the agents used for flavoring smokeless tobacco, is added to the composition to provide a pleasing taste which is pleasing to both adults and children and an odor which somewhat resembles that of genuine flavored snuff.

The substitute for oral smokeless tobacco of the present invention embodies most of the physical characteristics and offers the social gratifications stemming from the use of genuine smokeless tobacco. The mixture of fragments of tea, which is the main carrier ingredient, and a binding agent provides a composition in a dark brown color and of a moderately coarse tactile sensation similar to that of certain kinds of snuff and chewing tobacco.

The mode of use is identical with that of snuff. A user of the composition "dips" his fingers into the can, takes a small pinch of the composition between his thumb and forefinger, and places the composition in his mouth between the gum and cheek. The composition causes the production in the user's mouth of a brown juice which resembles the color of juice produced by dipping or chewing genuine smokeless tobacco. The brown juice may be expectorated or, unlike the juice produced through the use of genuine oral smokeless tobacco, it may be swallowed without the risk of stomach upset.

Additional objects and advantages of the present invention will be apparent from the following detailed description of the method of making the substitute for oral smokeless tobacco.

DESCRIPTION OF PREFERRED EMBODIMENT

The substitute for oral smokeless tobacco of the present invention comprises tea, a binding agent of honey, flour, water, and liquid flavoring. Fragments of tea of the type available in bulk form such as, for example, peppermint leaf herbal tea comprise the carrier ingredient of the composition. The tea can be cut in the form of elongated shreds, which simulate the appearance of chewing tobacco, or in small flakes, which simulate the appearance of snuff. Flakes of tea are preferred for placing the composition in a container of the type in which snuff is packaged. A composition containing a tea concentration of between about 9 and 15 parts by volume is deemed adequate to provide the necessary texture to simulate that of genuine oral smokeless tobacco.

The binding agent, preferably comprising honey and flour, causes the fragments of tea to agglutinate and thereby holds the composition together while the user pinches a portion from the container and keeps the selected portion in his mouth. A composition containing a binding agent comprising a honey concentration of between about 2 and 5.5 parts by volume and a flour concentration of between about 0.15 and 2 parts by volume is adequate to sufficiently agglutinate the fragments of tea to simulate the texture and appearance of smokeless tobacco. The fragments of tea and honey are first mixed and cooked at a medium to low temperature for 2 to 6 minutes. The flour together with a quantity of water is then added to and cooked for 1 to 2 additional minutes with the tea and honey to produce a moderately agglutinated cohesive mixture. The water is added to the mixture in a quantity sufficient to moisten the fragments of tea to simulate a fresh, moist smokeless tobacco product. A composition containing a water concentration of between about 2.0 and 5.5 parts by volume is adequate to develop the desired moisture content.

Flavoring of the type generally found in smokeless tobacco products is added to the composition. The flavoring agent is preferably a liquid extract selected from the group consisting of licorice, lemon, banana, peppermint, wintergreen, cinnamon, and spearmint. A composition containing a flavoring agent concentration of between about 0.25 and 2.5 parts by volume is adequate to provide the desired taste. The quantity of flavoring agent added to the composition determines the period of flavor release in the user's mouth. The flavoring typically lasts from about 8 to 30 minutes for the concentration range of flavoring agent indicated. The resulting composition is cooked for about one additional minute.

EXAMPLE

The present invention is further illustrated by way of a specific example in the preparation of the substitute for oral smokeless tobacco in an amount which fills a low profile cylindrical container in which a 1.2 ounce quantity of snuff is typically packed.

A composition was prepared in accordance with the proportioning of the ingredients listed in Table I.

TABLE I

| Ingredients | Volumetric Parts (Teaspoons) |
| --- | --- |
| Tea (bulk form) | 12 |
| Honey | 3 |
| Water | 3 |
| Flour | 1 |
| Flavoring (licorice liquid extract) | 0.5 |

The composition was prepared in accordance with the following processing steps. The honey and tea were mixed and cooked for about 4 minutes at a low level of heat, which was sufficient to moderately agglutinate the cohesive mixture. The quantities of flour and water were mixed together and then added to the coherent mixture of tea and honey. The resulting composition was heated at the same temperature for two additional minutes. The liquid flavoring was then added, and the entire composition was cooked for one additional minute.

The composition was removed from the heat and gently packed in a low profile cylindrical container such as the one in which a 1.2 ounce quantity of snuff is packed. The composition presented the appearance of a fresh, moist product. The composition was dark brown and had a texture which generally simulated that of finely cut snuff. The aroma emanating from the container was that of licorice and tea. The composition was pinched and easily pulled apart in small portions. A pinch of moderate size inserted in the mouth between the cheek and gum lasted about 8 minutes in flavorful duration. The composition had a sweet taste of licorice and tea. The composition did not dissociate in the mouth after the period of flavor release had expired. The color of the expectorate was brown and resembled that produced with the use of genuine smokeless tobacco.

It will be obvious to those having ordinary skill in the art that many changes may be made in the above-described details of the preferred method of the present invention. The scope of the present invention, therefore, should be determined only by the following claims.

I claim:

1. A method of making a substitute for oral smokeless tobacco comprising:
    applying to fragments of tea a binding agent that includes flour, the binding agent being applied at a temperature sufficient to form a moderately agglutinated cohesive mixture thereof; and
    moistening the fragments of tea sufficiently to form a compact mass that is dissociable into portions of selectable size by hand-pinching the mass.

2. A method of making a substitute for oral smokeless tobacco, comprising:
    applying to fragments of tea a binding agent that includes a mixture of between about 2 to 5.5 parts of honey and of between about 0.15 and 2 parts of flour, thereby to form a cohesive mixture of the fragments of tea and binding agent; and
    moistening the fragments of tea sufficiently to form a compact mass that is dissociable into portions of selectable size by hand-pinching the mass.

3. A substitute product for oral smokeless tobacco prepared in accordance with claim 2.

4. A method of making a substitute for oral smokeless tobacco comprising:

forming a cohesive mixture including flakes of tea and a binding agent comprising honey and flour, the mixture containing between about 9 and 15 parts of the tea and between about 2.15 and 7.5 parts of the binding agent; and adding to the tea between about 2 and 5.5 parts of a moistening agent, thereby to form a composition which is separable into fragments of selectable sizes by hand-pinching the composition.

5. The method of claim 4 in which the binding agent comprises between about 2 and 5.5 parts of honey and between about 0.15 and 2 parts of flour.

6. The method of claim 4 which further comprises introducing between about 0.25 and 2.5 parts of a flavoring agent.

7. The method of claim 6 in which the flavoring agent is a liquid extract selected from the group consisting of licorice, lemon, banana, peppermint, wintergreen, cinnamon, and spearmint.

8. The method of claim 4 in which the moistening agent is water.

9. A substitute for oral smokeless tobacco comprising:
a cohesive mixture including flakes of tea and a binding agent comprising honey and flour, the mixture comprising between about 9 and 15 parts of the tea and between about 2.15 and 7.5 parts of the binding agent; and between about 2 and 5.5 parts of a moistening agent, thereby forming a composition which is separable into fragments of selectable sizes by hand-pinching the composition.

* * * * *